United States Patent
Novik et al.

(10) Patent No.: US 7,577,691 B2
(45) Date of Patent: Aug. 18, 2009

(54) EXTENDING HIERARCHICAL SYNCHRONIZATION SCOPES TO NON-HIERARCHICAL SCENARIOS

(75) Inventors: Lev Novik, Bellevue, WA (US); Douglas B. Terry, San Carlos, CA (US); Irena Hudis, Bellevue, WA (US); Jeremie E. Sartor, Redmond, WA (US); Shaoyu Zhou, Issaquah, WA (US); Tomas Talius, Sammamish, WA (US); Yunxin Wu, Kirkland, WA (US); Jin He, Redmond, WA (US); Mark Scurrell, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 11/498,594

(22) Filed: Aug. 2, 2006

(65) Prior Publication Data

US 2008/0034012 A1 Feb. 7, 2008

(51) Int. Cl.
*G06F 17/30* (2006.01)

(52) U.S. Cl. .............................. 707/204; 707/4; 707/8; 707/200; 707/201; 707/203

(58) Field of Classification Search ............... 707/4, 707/200, 204, 8, 201, 203
See application file for complete search history.

(56) References Cited

U.S. PATENT DOCUMENTS

| 4,408,273 | A | 10/1983 | Plow |
| 5,438,674 | A | 8/1995 | Keele et al. |
| 5,706,510 | A | 1/1998 | Burgoon ............ 395/619 |
| 5,940,862 | A | 8/1999 | Erickson et al. |
| 6,014,086 | A | 1/2000 | Miyashita |
| 6,098,072 | A | 8/2000 | Sluiman et al. ............ 707/103 |
| 6,247,135 | B1 | 6/2001 | Feague |
| 6,256,634 | B1 * | 7/2001 | Moshaiov et al. ........... 707/100 |
| 6,487,560 | B1 | 11/2002 | LaRue |
| 6,499,039 | B1 | 12/2002 | Venkatesh et al. |
| 6,529,944 | B1 | 3/2003 | LeCrone |
| 6,907,414 | B1 | 6/2005 | Parnell ....................... 706/47 |
| 6,928,467 | B2 | 8/2005 | Peng |
| 7,146,385 | B1 * | 12/2006 | Bruce .......................... 707/201 |
| 7,222,141 | B2 | 5/2007 | Zondervan et al. |
| 7,251,670 | B1 * | 7/2007 | Day .............................. 707/203 |

(Continued)

FOREIGN PATENT DOCUMENTS

WO   WO 94/11806 A1   5/1994

(Continued)

OTHER PUBLICATIONS

Intellisync Data Sync, "A detailed guide to functionality," *Intellisync Mobility Unlimited*, 2004, 1-13.

(Continued)

*Primary Examiner*—Don Wong
*Assistant Examiner*—Thanh-Ha Dang
(74) *Attorney, Agent, or Firm*—Woodcock Washburn LLP

(57) ABSTRACT

Extending hierarchical synchronization (sync) scopes to non-hierarchical scenarios may involve a method for synchronizing differently organized data stores comprising mapping different physical organizations to similar logical organizations and utilizing an organization-based synchronization algorithm to synchronize the differently organized stores. Also, the uniqueness constraints of the organizations may be preserved as well as the parent-child ordering constraints of the organizations.

20 Claims, 5 Drawing Sheets

U.S. PATENT DOCUMENTS

| | | | |
|---|---|---|---|
| 7,290,019 | B2 | 10/2007 | Bjorner et al. |
| 2002/0133508 | A1 | 9/2002 | LaRue |
| 2002/0167538 | A1 | 11/2002 | Bhetanabhotla ............. 345/700 |
| 2002/0194207 | A1 | 12/2002 | Bartlett |
| 2003/0191827 | A1* | 10/2003 | Piispanen et al. ........... 709/221 |
| 2004/0153473 | A1* | 8/2004 | Hutchinson et al. ...... 707/104.1 |
| 2005/0015405 | A1 | 1/2005 | Plastina et al. ........... 707/104.1 |
| 2005/0015436 | A1 | 1/2005 | Singh et al. |
| 2005/0027748 | A1 | 2/2005 | Kisley ........................ 707/200 |
| 2005/0027817 | A1 | 2/2005 | Novik |
| 2005/0050114 | A1* | 3/2005 | Soinio ........................ 707/204 |
| 2005/0125430 | A1 | 6/2005 | Souder et al. |
| 2005/0165806 | A1* | 7/2005 | Roatis et al. ................ 707/100 |
| 2006/0184589 | A1 | 8/2006 | Lees et al. |
| 2006/0288053 | A1* | 12/2006 | Holt et al. ................... 707/203 |
| 2007/0088669 | A1* | 4/2007 | Jaschek et al. ................. 707/1 |
| 2008/0168072 | A1* | 7/2008 | Freedman ................... 707/100 |

FOREIGN PATENT DOCUMENTS

| | | |
|---|---|---|
| WO | WO 96/15491 A1 | 5/1996 |
| WO | WO2005/093753 A1 | 10/2005 |

OTHER PUBLICATIONS

Reiher, P., et al., "A user-level file replication middleware service," http://lasr.cs.ucla.edu/travler/rumor_position_paper.html, downloaded from the Internet on Apr. 19, 2006, 3 pages.

"Unison file synchronizer," *Unison*, http://www.cis.upenn.edu/~bepierce/unison, downloaded from the Internet on Apr. 19, 2006.

Byung-Y Lee et al., Data Synchronization Protocol in Mobile Computing Environment Using SyncML, *5th IEEE International Conference on High Speed Networks and Multimedia Communication*, 2002, 133-137.

Fujii, A. et al., "A Fast Sequential Distributed Synchronization Protocol", *Systems and Computers of Japan*, Nov. 15, 1998, 29(12), 11-18.

Mourlas, C. et al., "Task Synchronization for Distributed Real-Time Applications", *IEEE Computer Social*, 1999, 184-190.

Parrow, J. et al., Designing a Multiway Synchronization Protocol, *Computer Communications*, Dec. 1996, 19(14), 1151-1160.

Chrobot, S. et al., "Common Primitives for Synchornization Protocols", *Kuwait Journal of Science & Engineering*, 1996, 97-111.

Rajkumar, R., Real-Time Synchronization Protocols for Shared Memory Multiprocessors, *IEEE Computer Social Press*, 1990, 116-123.

Jajodia, S. et al., Transaction Processing in Multilevel-Secure Databases Using Replicated Architecture, *IEEE Computer Social Press*, 1990, 360-368.

Rahm, E., "A Reliable and Efficient Synchronization Protocol for Database Sharing Systems", *Fault-Tolerant Computer Systems 3rd International CI/ITG/GMA Conference Proceedings*, 1987, 336-347.

Miranda, S., A Formal Specification Framework for Synchronization Protocols in Distributed Data Bases, *Distributed Data Sharing Systems Proceedings of the Second International Seminar, Netherlands*, 1982, 45-54.

English-language Abstract and Article of Adaka, M. et al., "A Dynamic Synchronization Protocol and Scheduling Method. Based on Timestamp Ordering for Real-Time Transactions", *Institute of Electronics Information and Communication Engineering*, Apr. 1999, vo.. J82D-I, No. 4, pp. 560-570.

\* cited by examiner

EXTENDING HIERARCHICAL SYNCHRONIZATION SCOPES TO NON-HIERARCHICAL SCENARIOS

CROSS REFERENCE TO RELATED APPLICATIONS

This invention is related to the following commonly assigned patent applications, the entirety of which are hereby incorporated by reference: U.S. patent application Ser. No. 10/631,591, filed Jul. 31, 2003, entitled "Systems and Methods for Replicating Data Stores," and U.S. patent application Ser. No. 10/692,508, filed Oct. 24, 2003, entitled "Systems and Methods for Providing Relational and Hierarchical Synchronization Services for Units of Information Manageable by a Hardware/Software Interface System."

COPYRIGHT NOTICE AND PERMISSION

A portion of the disclosure if this patent may contain material that is subject to copyright protection. The copyright owner has no objection to the facsimile reproduction by anyone of the patent document of the patent disclosure, as it appears in the Patent and Trademark Office patent files or records, but otherwise reserves all copyright rights whatsoever. The following notice shall apply to this document: Copyright© 2006, Microsoft Corp.

BACKGROUND

Storage platforms increasingly are providing an improved ability to organize, search, and share all types of data in a computer system. These storage platforms extend and broaden the data platform beyond traditional file systems and database systems, and are designed to be the store for all types of data. One example of such a storage platform is Microsoft Windows® Future Storage or Microsoft Windows® File System (WinFS). Data stored within such a storage platform is often shared, replicated, and stored in different physical and logical locations among many users, individuals and applications and thus may require a certain level of synchronization for the data to appear consistent.

WinFS Synchronization (WinFS Sync), described in U.S. patent application Ser. No. 10/692,508, filed Oct. 24, 2003, entitled "Systems and Methods for Providing Relational and Hierarchical Synchronization Services for Units of Information Manageable by a Hardware/Software Interface System," and other synchronization solutions for hierarchical stores define synchronization scopes (the data to be synchronized) to be portions of the hierarchy (e.g. a folder tree). Many scenarios exist in which such synchronization scopes are inadequate. For example, this may be the case where moving an item into a folder in order to make it sync is too much of a burden, or where an item must be in two independent synchronization scopes. A common example is wanting to share a picture with someone, without moving this picture out of the folder it is in. However, supporting non-hierarchical sync scopes in hierarchical stores (such as WinFS or most file systems) in a multi-master environment is very difficult.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, extending hierarchical synchronization (sync) scopes to non-hierarchical scenarios is provided. For several embodiments, a method for synchronizing differently organized data stores comprises mapping different physical organizations to similar logical organizations and utilizing an organization-based synchronization algorithm to synchronize the differently organized stores. Also, the uniqueness constraints of the organizations may be preserved as well as the parent-child ordering constraints of the organizations.

Below is a description of other advantages and features of the invention.

BRIEF DESCRIPTION OF THE DRAWINGS

Extending hierarchical synchronization (sync) scopes to non-hierarchical scenarios is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Environment

Figure 1:
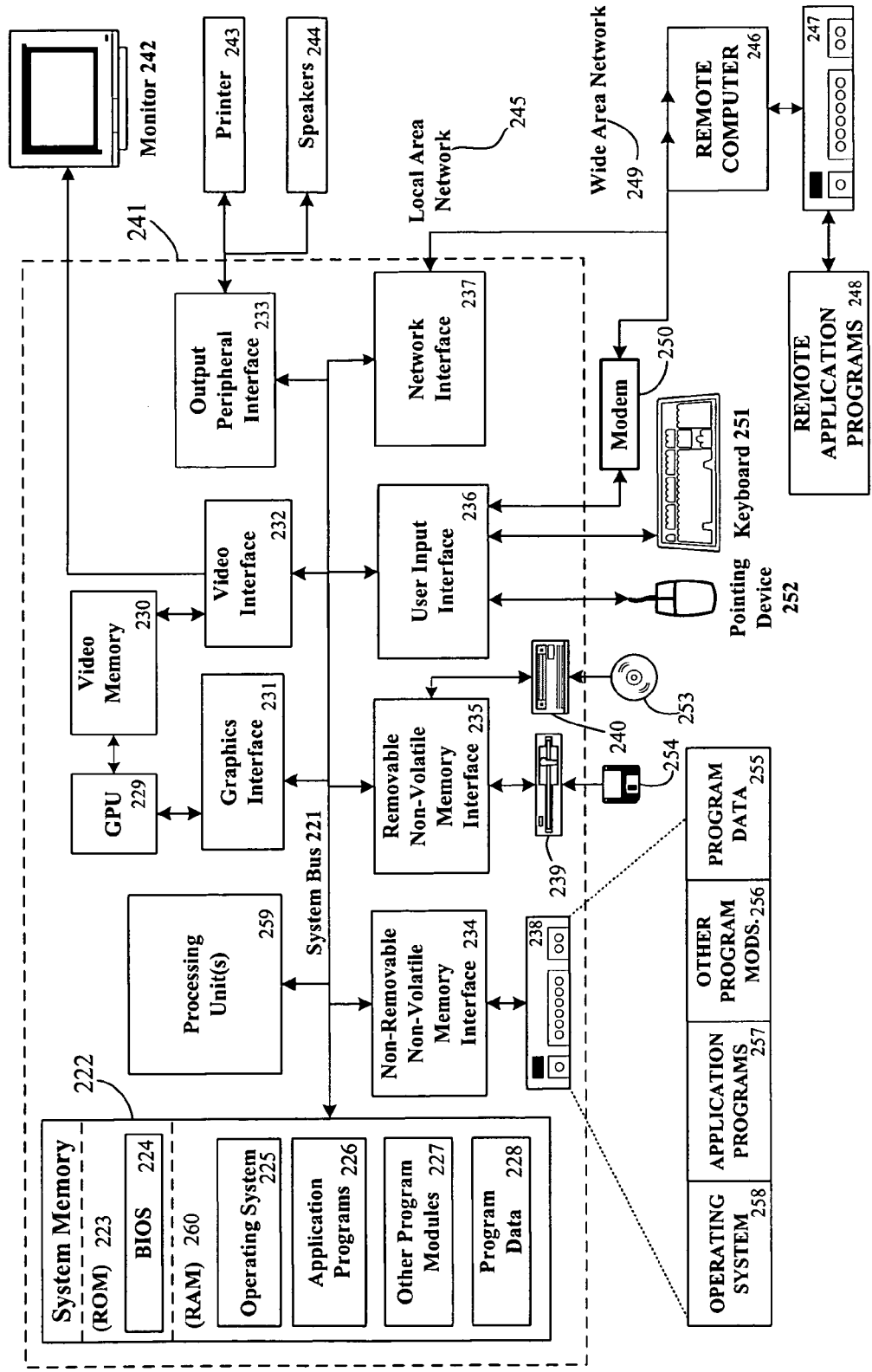
FIG. 1 is a block diagram representing an exemplary computing device suitable for use in conjunction with extending hierarchical synchronization sync scopes to non-hierarchical scenarios.

Referring to FIG. 1, shown is a block diagram representing an exemplary computing device suitable for use in conjunction with implementing the processes described above. For example, the computer executable instructions that carry out the processes and methods for extending hierarchical synchronization (sync) scopes to non-hierarchical scenarios may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described. below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more standalone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
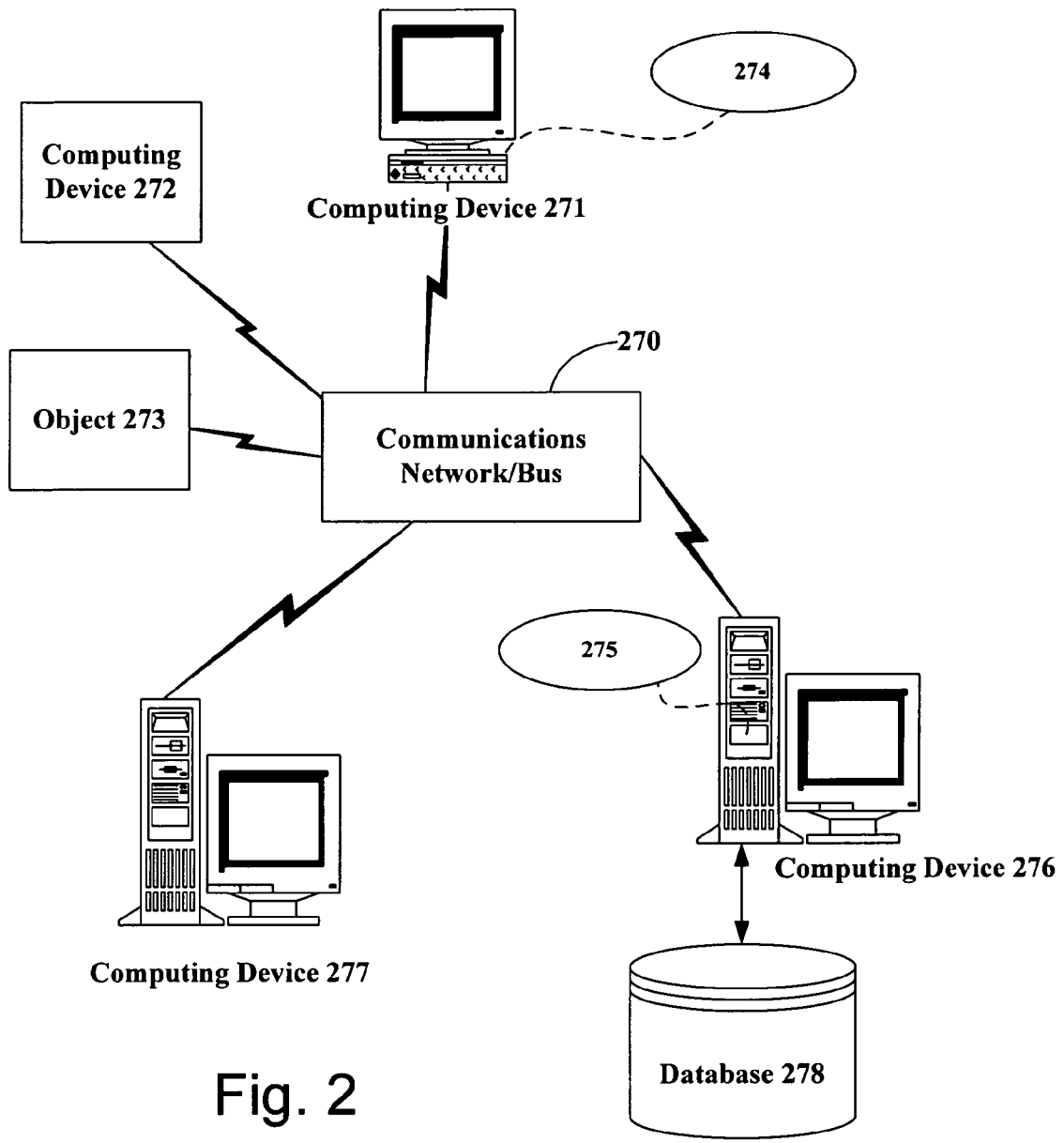
FIG. 2 illustrates an exemplary networked computing environment in which many computerized processes may be implemented to perform extending hierarchical sync scopes to non-hierarchical scenarios.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing processes that extend hierarchical synchronization (sync) scopes to non-hierarchical scenarios. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

Synchronization Application Programming Interface (API) Overview

Although the concepts, ideas, features and implementations described herein are described in an exemplary fashion with respect to how they are implemented in a file system called Microsoft Windows® Future Storage or Microsoft Windows® File System (WinFS) and the Microsoft Windows Vista® operating system (formerly code-named "Longhorn"), implementations in and applicability to other operating and file systems are contemplated, entirely possible and apparent to those skilled in the art based on the exemplary descriptions provided herein.

In an increasingly distributed, digital world, individuals and workgroups often store information and data in a variety of different devices and locations. This has fueled the development of data synchronization services that can keep the information in these separate, often disparate, data stores synchronized at all times, with minimal user intervention.

The synchronization platform described herein, which is part of the rich storage platform (a.k.a., "WinFS") described in U.S. patent application Ser. No. 10/692,508, filed Oct. 24, 2003, entitled "Systems and Methods for Providing Relational and Hierarchical Synchronization Services for Units of Information Manageable by a Hardware/Software Interface System," the entirety of which is hereby incorporated by reference, addresses three main objectives:

Allow applications and services to efficiently synchronize data between different "WinFS" stores.

Enable developers to build rich solutions for synchronizing data between "WinFS" and non-"WinFS" stores.

Provide developers with appropriate interfaces to customize the synchronization user experience.

1. General Terminology

Herein below are some further refined definitions and key concepts relevant to later discussions herein:

Sync Replica: Most applications are only interested in tracking, enumerating and synchronizing changes for a given subset of items within the WinFS store. The set of items that take part in a synchronization operation is termed as a Synchronization Replica. A Replica is defined in terms of items contained within a given WinFS containment hierarchy (usually rooted at a Folder item). All synchronization services are carried out within the context of a given replica. WinFS Sync provides a mechanism to define, manage and cleanup replicas. Every replica has a GUID identifier that uniquely identifies it within a given WinFS store.

Sync Partner: A sync partner is defined as an entity capable of affecting changes on WinFS items, extensions and relationships. Thus, every WinFS store can be termed as a sync partner. When synchronizing with a non-WinFS store, the external data source (EDS) is also termed as a sync partner. Every partner has a GUID identifier that uniquely identifies it.

Sync Community: A synchronization community is defined as a collection of replicas that are kept in sync by means of peer-to-peer synchronization operations. These replicas may all be in the same WinFS store, different WinFS stores, or even manifest themselves as virtual replicas on non-WinFS stores. WinFS sync does not prescribe or mandate any specific topology for the community, especially if the only sync operations in the community are through the WinFS Sync service (WinFS adapter). Synchronization adapters (defined below) may introduce their own topology restrictions.

Change Tracking, Change Units and Versions: Every WinFS store tracks changes to all local WinFS Items, Extensions and Relationships. Changes are tracked at the level of change unit granularity defined in the schema. The top-level fields of any Item, Extension and Relationship type can be sub-divided by the schema designer into change units, with the smallest granularity being one top-level field. For change tracking purposes, every change unit is assigned a Version, where a version is a pair of sync partner id and a version number (the version number is a partner-specific monotonically increasing number). Versions are updated as changes happen in the store locally or as they are obtained from other replicas.

Sync Knowledge: Knowledge represents the state of a given sync replica at any time, i.e. it encapsulates meta-data about all the changes a given replica is aware of, either local or from other replicas. WinFS sync maintains and updates knowledge for sync replicas across sync operations. Important thing to note is that the Knowledge representation allows it to be interpreted with respect to the entire community and not just relative to the particular replica where the Knowledge is stored.

Sync Adapters: A synchronization adapter is a managed code application that accesses WinFS Sync services through the Sync Runtime API and enables synchronization of WinFS data to an EDS. Depending on the requirements of the scenario, it's up to the adapter developer as to which subset of WinFS data and what WinFS data types to synchronize. The adapter is responsible for communication with the EDS, transforming WinFS schemas to and from EDS supported schemas and defining and managing its own configuration and metadata.

Synchronization API Services

Synchronization services may comprise (among other services) two foundational services: change enumeration and change application.

1. Change Enumeration

Change Enumeration allows sync adapters to easily enumerate the changes that have occurred to a Replica since the last time synchronization with this partner was attempted based on the change-tracking data maintained by the synchronization service.

2. Change Application

As discussed earlier herein, change application allows Sync Adapters to apply changes received from their EDS to the local storage platform since the adapters are expected to transform the changes to the storage platform schema.

Synchronization Hierarchy

A Synchronization Replica defines the set of items that take part in a synchronization operation. Part of the Replica configuration is a WinFS containment hierarchy which is a single folder tree.

Extending Hierarchical Sync Scopes to Non-Hierarchical Scenarios

The fact that all data synchronized in the community is represented as a single folder tree presents two problems to users:

1) Items have to be physically moved if they are to be added to a sync community. This is sometimes problematic, as the user may have an interest in keeping the item path the same as before. They would like the item synchronized, but they do not want existing applications to break.

2) Since no item can be in two folders, it is difficult to share overlapping sets of items with different people. In other words, sync communities cannot overlap. They can only be fully contained in each other.

Example Scenario

One example scenario may stem from a requirement to build a one-way publication application for pictures. In this model, a user can select an arbitrary set of pictures from his WinFS and have them be published to one or more users. Those users will be able to execute a one-way receive sync against the publication periodically, thus keeping an off-line cache of all of the shared pictures. The key problems for the application are that a user may want to share the same picture with multiple other users, each user being a separate sync community; the user also cannot move the pictures from the folder where they reside to the folder used for the sync replica.

Figure 3:
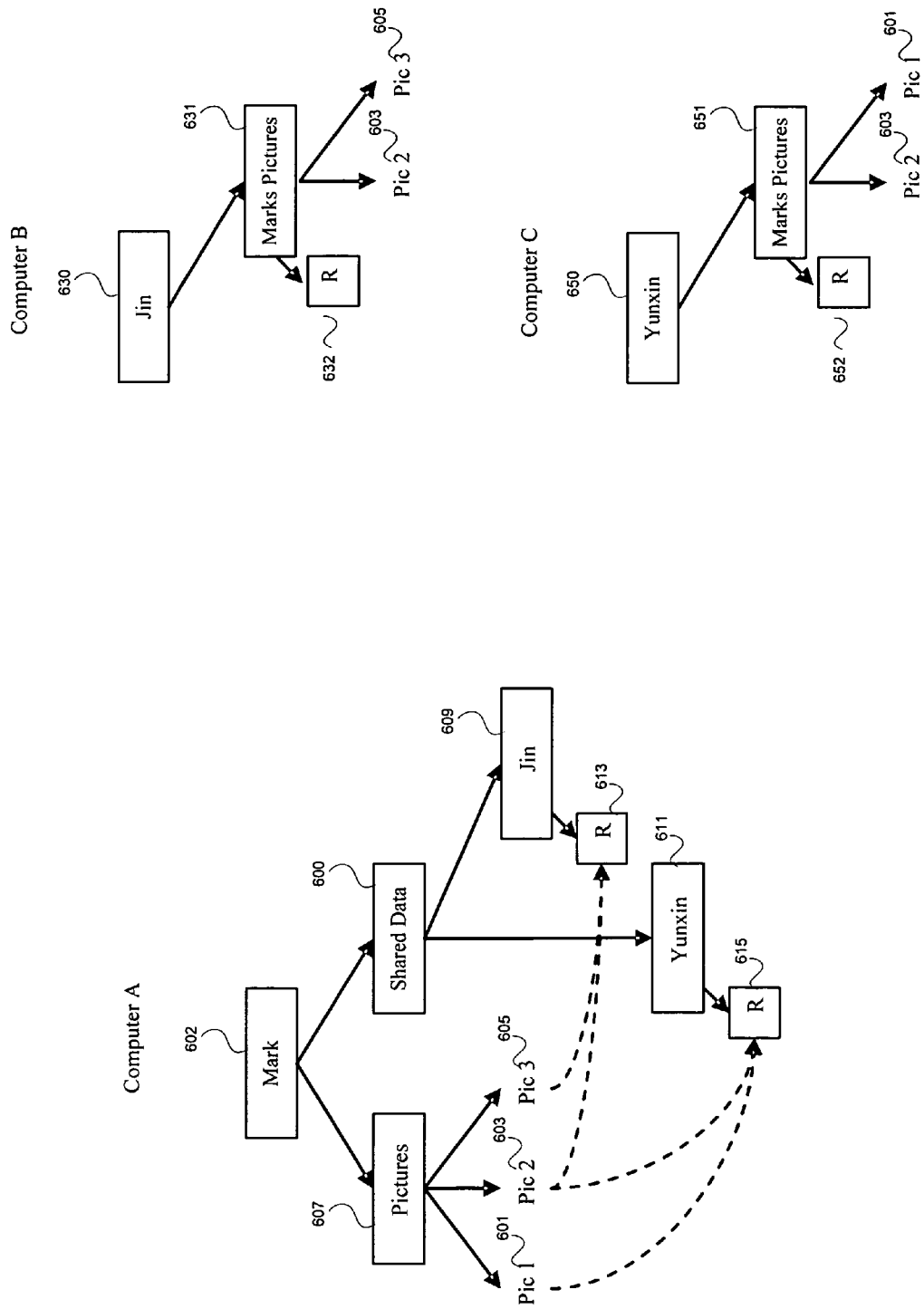
FIG. 3 is a block diagram illustrating an example scenario wherein one or more sync communities are created by a user.

Referring next to FIG. 3, shown is a block diagram illustrating this example scenario wherein two sync communities are created by a user. Two sync communities are created by a user where the contents for each community are individual items contributed to the community and therefore left in their original location. The same item can be contributed to multiple communities.

In the example provided in FIG. 3, there are three pictures 601 603 605 in the "Pictures" folder 607, which is not synchronized, for user Mark 602. In the folder for the sync application 600, the user 602 has configured two sync communities, one with Jin 609 and one with Yunxin 611. The user wants to share "Pic 1" 601 and "Pic 2" 603 with Yunxin 611 and "Pic 2" 603 and "Pic 3" 605 with Jin 609. Folders 609 and 611 are created for each user and sync replicas 613 and 615 created for each user. The desired pictures are then contributed to each replica, thereby extending the hierarchical sync scope. On computer B, user Jin 630 has created folder 631 to receive the synchronized pictures with an associated sync replica 632. When synchronized with replica 613 on computer A, "Pic 2" 603 and "Pic 3" 605 are created as if they were in the hierarchical sync scope on computer A. On computer C, user Yunxin 650 has created folder 651 to receive the synchronized pictures with an associated sync replica 652. When synchronized with replica 613 on computer A, "Pic 2" 603 and "Pic 1" 601 are created as if they were in the hierarchical sync scope on computer A.

Example Design for Extending Hierarchical Sync Scopes to Non-Hierarchical Scenarios Extending hierarchical synchronization (sync) scopes to non-hierarchical scenarios may, for example, comprise the following features:

1) Allows items to be added to a sync community without physically moving them.

2) Allows items to be contributed to any container in the replica root.

3) Allows both generic container items and compound items to be contributed.

4) Contributed items will appear in the replica folder hierarchy on remote replicas.

5) Both one-way (Send only) and two-way (Send & Receive) sync are supported.

For configuration, API's are provided to allow items to be contributed to a replica's sync scope and un-contributed from a replica's sync scope. If there are multiple replica's then the contribution/un-contribution is made to each replica where the item is to be synced. This is a sync-specific concept. The contributed item can be a generic container or a compound item, but cannot be an embedded item. The namespace name of the contributed item is used on a remote replica. A container is specified for each contributed item which is used to determine the location of the item on a remote replica. It is possible to update the contribution container after the initial contribution. The list of contributed items for a Replica are available from each Replica object.

For WinFS-WinFS sync, changes are enumerated from the contributed item, except the container. If a generic container is contributed, all items in or under the container will be synced. The term 'the contributed item' herein refers to only the generic container (that is contributed) in this case, not the items in or under it. The contributed item is applied on a remote replica in the location specified by the contribution configuration. All changes made on a remote replica, including deletes, are synced back to the contributed item.

For sync with an external store, change enumeration will return the contributed item, including its item id and namespace name, but with the container specified by the contribution configuration. For change application, the contributed item will be required materialized and updated. No changes would be required to an adapter for this as the item id of the contributed item was returned by change enumeration. For a container id change, it is made by the adapter to the contributed item, but sync change application detects those changes and update the contribution configuration.

For conflict management, conflict detection and system resolution is performed on the contributed item, including the namespace name.

Configuration:

The following methods are added to the Replica class. The changes made using the new methods will not be applied until the SaveChanges method is called.

targetContainer is not a generic container under the replica root or under a contributed container.

This method will fail with ItemAlreadyContributed exception if:

rootItem is already in the replica—under the replica root or already contributed. Already contributed could either mean that the item had been specifically contributed or is a child item of a contributed container.

This method will fail with ContributionNamespaceName-Collision if:

An item with the namespace name of rootItem already exists in targetContainer—either a "real" item or a contributed item.

This method will fail with ArgumentNullException if:

rootItem or targetContainer were null.

```
Class Replica
{
    // New methods
    // Add - Must be able to instantiate the item being contributed and the target container
    public void AddContribution (Item rootItem, Item targetContainer);
    // Remove - The item may have been deleted so the key is used.
    public void RemoveContribution (StorageKey rootItemLocalKey);
    // Move - Must be able to instantiate the item being moved and the target container
    public void MoveContribution (Item rootItem, Item targetContainer);
    // Obtain all contributions for the replica
    public ReadOnlyCollection<ReplicaContribution> GetContributionset( );
    // Obtain all contributions in a container in the replica
    public ReadOnlyCollection<ReplicaContribution> GetContributionSetForContainer(
                                        StorageKey targetContainerKey);
};
public class ReplicaContribution
{
    // No public constructors
    // Properties
    public StorageKey ContributionRootItemKey { get; }
    public StorageKey TargetContainerKey { get; }
}
```

AddContribution:

For the AddContribution Method:

rootItem is the root item of the contributed item. It can be a generic container (such as a folder) or an individual compound item.

targetContainer is the generic container where the contributed item will be placed on a remote replica. The target container can be under the replica root or could be under another contributed container—nested contributions.

Allowing nested contributions appears unnecessary, however they are allowed in the present design example because the situation could still occur due to moves on a remote replica. The root of one contribution could be moved under another container that was contributed.

An ancestor container of an already contributed item can be specified:

Both the existing contribution and the new contribution are valid.

The existing contribution will effectively override the WinFS container hierarchy specified by the new contribution. The existing contribution will therefore remain with the same container on a remote replica, even though it has a different container in the new contributed hierarchy.

This method will fail with InvalidOperationException with a detailed message if:

rootItem does not exist.

rootItem is an embedded item.

RemoveContribution:

The RemoveContribution method takes the local storage key of the contributed item and removes it from the contribution configuration. The storage key can be obtained from the contributed item itself (if it still exists and is accessible) or can be obtained from the ReplicaContribution object.

On the next sync this will be enumerated as a move-out. This method will fail with ArgumentException if:

rootItemLocalKey is the storage key for an entity other than an item. This method will fail with InvalidOperationException if:

The item is not a contribution root to the replica.

This Method Will Fail with ArgumentNullException if:

rootItemLocalKey is null.

MoveContribution:

Perform the Equivalent of a Local Move, but for a Contributed Item:

On the next sync this will be enumerated as a move.

This Method Will Fail with InvalidOperationException With a Detailed Message if:

rootItem does not exist.

rootItem was not contributed to the replica.

targetContainer is not a generic container under the replica root or under a contributed container.

This Method Will Fail With ContributionNamespaceName-Collision if:

An item with the namespace name of rootItem already exists in targetContainer—either a "real" item or a contributed item.

This method will fail with ArgumentNullException if:
rootItem or targetContainer were null.

GetContributionSet:

Obtain the set of contributions made to this replica. A snapshot of the contributions will be taken with the set of ReplicaContribution objects being instantiated when the call is made.

If no contributions were made to the replica, then an empty collection will be returned.

GetContributionSetForContainer:

Obtain the set of contributions made to this replica, but filtered to the specified container. A snapshot of the contributions will be taken with the set of ReplicaContribution objects being instantiated when the call is made.

If no contributions were made to the specified container, then an empty collection will be returned.

This method will fail with ArgumentException if:
targetContainerKey is the storage key for an entity other than an item.

Provided below is a description of the design of the operations of the Mainline Sync behavior.

AddContribution operation: All items that have been contributed since the last sync with this partner are treated as move-ins.

RemoveContribution operation: The result of the operation depends on whether or not the contribution root is under the replica root or another contribution root that is being synced (see later for cases for contributed items not being synced). If not, all the contributed items will be treated as move-outs. If yes, the operation will be handled by sync as a move of the contribution root to its current container.

MoveContribution operation: The operation is handled as a move of the contribution root by sync.

Target Container Operations: Deletions, move-outs and un-contributions of target containers may have side effects. Local deletions of target containers of any contributions will result in those contributions being removed. This will be done in a sync session automatically. Remote deletions of target containers will not result in un-contributions until the container deletion is change enumerated during a sync to a third replica. Contributed items under any contribution root whose target container has been moved out will be handled as move-outs. The contribution (i.e. their configurations) will remain but the contributed items will no longer be synced. A special kind of target container "moveout" may happen when the target container is moved under one of its contributed items (that is a generic container). Contributed items under any contribution roots whose target containers have been un-contributed will be handled as move-outs. The contributions (i.e. their configurations) will remain but they will no longer be synced.

The sync behaviors regarding to deletions is inconsistent with that of move-outs and un-contribution as described above.

Contribution Root Deletion: Deletion of contribution root will be synced as a regular deletion. It will not result in un-contribution. However, when the resurrection of the item by conflict handling in sync will result in un-contribution.

Move Operations: Moves of items that are not contribution roots across contribution roots and the replica root will result in regular move at remote replicas, unless the move results in the target container of a contribution to be under the contribution root, in which case, the contributed items will be treated as move-outs. Move of a contribution root will be synced as a no-op move, i.e., an item moved to somewhere and then moved back (to the target container).

Change enumeration (including preprocessing): When changes are enumerated (whether for purposes of WinFS-to-WinFS Synchronization or by an adapter), the following occurs:

The contribution root item will be enumerated, with its Container being replaced by that specified in the contribution configuration.

A link from the contributed item will dangle if the target item is not in the replica scope (folder hierarchy or contributed).

A link from an item in the sync scope to a contributed item (or any of its children) will be enumerated.

A local item could be created (created, copied, existing item renamed, etc.) that collides with the namespace name of a contributed item. WinFS will not detect this condition. Change enumeration will also not detect this condition—it will be left to change application to handle the name collision that WinFS will detect on the remote replica.

Figure 4:
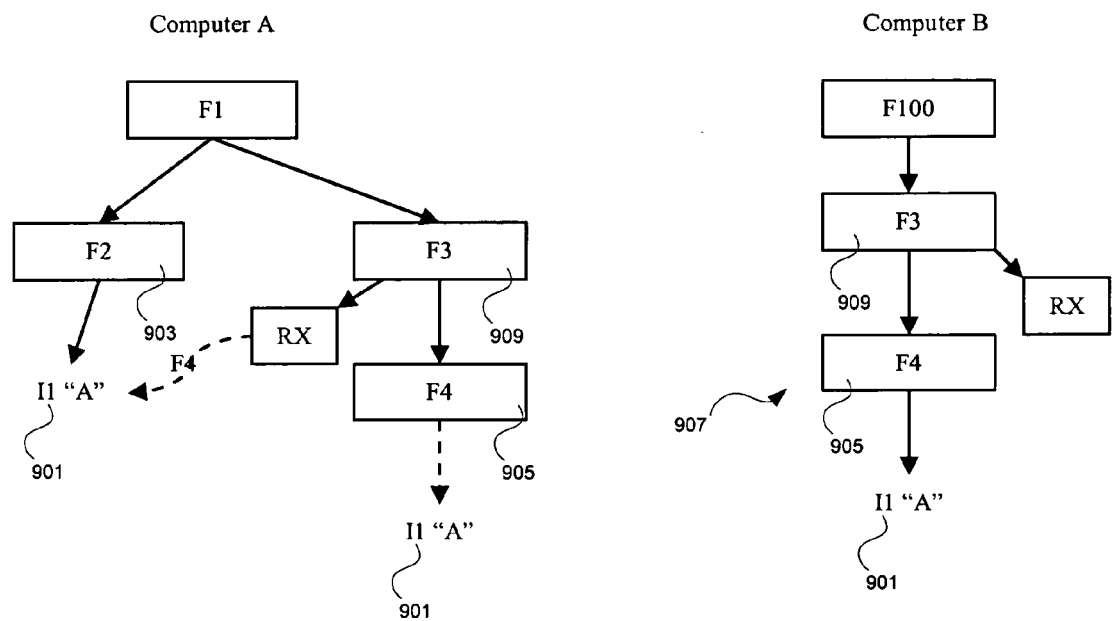
FIG. 4 is a block diagram illustrating an example scenario wherein item I1 is initially contained by folder F2 and contributed to folder F4.

If a contributed item (container or compound item) is moved under the replica root then the contribution configuration will still be enumerated instead of the WinFS hierarchy. Referring next to FIG. 4, shown is a block diagram illustrating an example scenario wherein item I1 "A" 901 is initially contained by folder F2 903 and contributed to folder F4 905. When synced, I1 901 therefore has container F4 905 on a remote replica 909.

If I1 901 is moved to F3 909 (with a WinFS move, not a contribution move) then on the next sync there is no change enumerated—there is still valid contribution configuration of I1 901 to F4 905 and that will take precedence in change enumeration over the fact that I1 901 is now contained by F3 909 in the WinFS namespace. This means that contribution could be used to change the layout on remote replicas, but this is not expected to be a common scenario.

The main principle is that if the contribution configuration is valid (valid contributed item and valid contribution container) then the contribution will always be respected by sync change enumeration.

Change Application:

When Changes are Applied, the Following Occurs:

All changes to the contributed item will be applied to the contributed item, except for moves.

Moves will lead to the contribution configuration being updated.

At the contributing replica, a remote deletion of a contributed item will result in deletion of the contribution item (and any children in the case of a generic container) and un-contribution.

Specific Name Collision Scenarios: There are a couple of scenarios very specific to item contribution that will be described and the behavior defined.

Local Name Collision: An item in the contribution container is created or an existing item renamed so it has the same name as a contributed item. The local operation that causes the "collision" would be allowed as the contribution is not known by the WinFS data model; WinFS Sync has to deal with this scenario.

The collision will be detected during change application on a remote replica. The WinFS Update API will throw an exception due to the name collision. This will be handled by the sync runtime by renaming one of the items. The rename will be a local change and synced back, just as a conflict resolution.

An alternative is to treat this as a new kind of conflict and allow system or deferred rename. This would be a completely different kind of conflict as both the changes came one source. Adding a new type of conflict would be confusing for the user and have a large impact. However, this scenario should also be rare. The chances of this happening are reduced by the fact that a name collision check is performed when items are contributed.

Remote Rename Name Collision: In this case a remote rename made to an item that was contributed. The rename is synced back to the replica with the contribution, but the rename collides with another item in the container of the contributed item. There is therefore a name collision with an item outside of the sync scope.

The collision will be detected during change application by the sync runtime and an automatic rename of the contributed item (item in the sync scope) performed. This should be a rare scenario and therefore an acceptable solution.

Conflict Management:

In general conflict detection and resolution involving contributed items is the same as with items in the replica tree. All change units will be taken from the contributed item except the container id of the contribution.

Conflicts involving moves are supported as with a non-contributed item, but special handling will probably be required to deal with the fact that the container for a contributed item is not stored with the contributed item. The following provides a description of how conflicts may be handled in certain situations.

Update-Update Conflicts: An interesting case is a move conflict. The target container is updated on the replica with the contribution and the contributed item is moved on a remote replica.

Name Uniqueness Conflicts: A name uniqueness conflict for a contributed item will be treated the same as for a non-contributed item, except for the scenarios described previously.

Update-Delete conflict handling: In the main, there will be no differences in the handling of these conflicts between contributed and non-contributed items, including move updates. Exceptions to this are as follows:

A contributed item is deleted locally and updated remotely with the conflict policy set so that remote wins. The contributed item root will be resurrected, but as a non-contributed item in the container specified by the remote replica (probably the contribution container).

An item has been contributed locally, but the contribution folder has been deleted remotely. The conflict will be raised and handled normally as local new child and remote parent deletion.

Conflict Enumeration: The conflict enumeration API will allow the locally conflicting contributed item to be returned. The container id will be set to that specified by the contribution configuration.

Adapter Services. A fundamental principal is that an adapter writer should not have to explicitly cater for both regular and contributed items so, in the main, adapter code can be written with no knowledge of item contribution.

Change Enumeration: Change enumeration will basically return the contributed item. For a contributed item, the contribution container is returned instead of the container indicated by the contributed item. For a contribution root item, the ContainerLocalKey property from the ItemChange class will be set to the key from the contribution configuration rather than the contribution root item.

Change Application: The adapter will use the id mapping service or its own mapping to fetch the item id of the contributed item. It can then instantiate that item and set the properties—it does not need to be aware that the item was contributed. The adapter could set the container id (a move) and the sync runtime change applier will need to update the contribution configuration. Once the changes are saved for the contributed item, the item will be refreshed so that the container id represents the value truly associated with the item and not that for the contribution configuration. This could be "odd" behavior because the value just set for the container will be replaced after the item changes were saved. It does mean the item is valid and consistent in case further changes are made.

Figure 5:
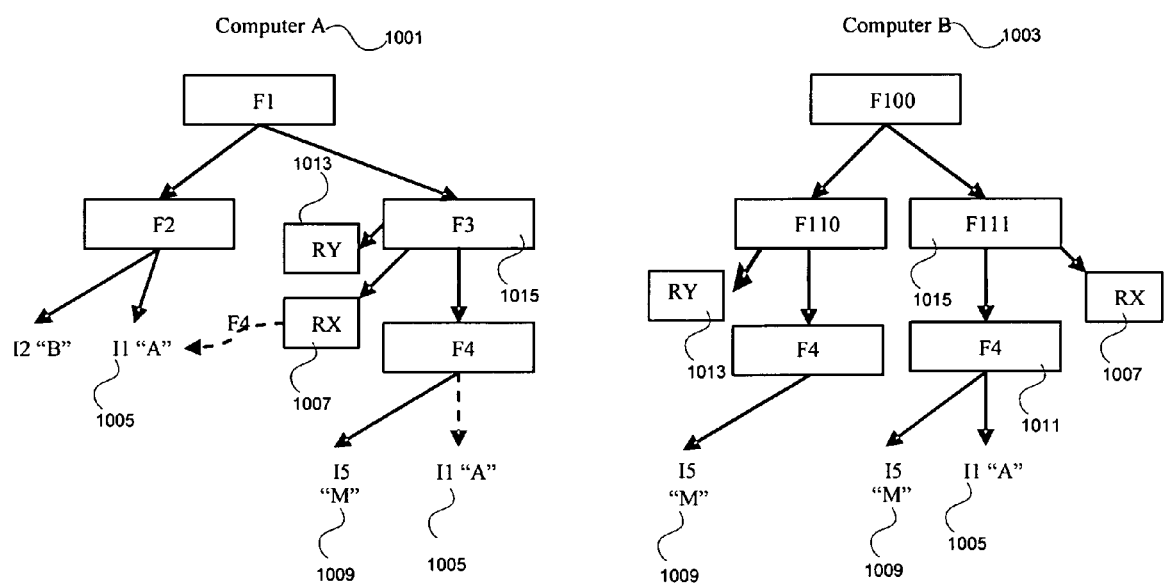
FIG. 5 is a block diagram illustrating an example scenario for providing a summary example synchronization behaviors.

Referring next to FIG. 5, shown is a block diagram illustrating an example scenario for providing a summary of example synchronization behaviors. These example synchronization behaviors are provided in the chart below and correspond to the diagram shown in FIG. 5:

| Computer A 1001, Replica X Operations → | Results of Send Sync to Computer B 1003 |
|---|---|
| Contribution Configuration | |
| Contribution of I1 "A" 1005 to replica RX 1007 | Creation of I1 1005 with namespace name "A" in container specified by contribution configuration (F4 1011) |
| Remove contribution of I1 1005 from replica RX 1007 | Deletion of I1 1005 |
| Update of contribution container I1 1005 | Move of I1 1005 |
| Update of item (except container), extensions, sourced links | I1 1005 updated |
| Move - still outside of sync scope | No change |
| Move - to inside sync scope (no un-contribution) | No change - contribution is still respected in preference to the WinFS namespace. |
| Move - to inside the sync scope then back out (could be a sync in-between) | No change - contribution is still respected in preference to the WinFS namespace. |
| Delete (un-contribution of I1 1005) | Delete of I1 1005 |
| Link to I1 1005 from sync scope | Link created to I1 1005 |
| I5 1009 renamed to "A" | I5 1009 set to "A", but with either I5 1009 or |

| -continued | |
|---|---|
| Deletion of F4 1011 & I5 1009 (un-contribution of I1 1005) | I1 1005 made unique automatically. Deletion of F4 1011, I1 1005 and I5 1009 |
| Computer A, Replica Y Operations → | Results of Send Sync to Computer B |
| Sync of RY 1013 without contribution of I1 1005 | No change - I1 1005 not synced |
| Results of Send Sync to Computer A | ← Computer B, Replica X Operations |
| | I1 1005 |
| I1 1005 is updated. | Update item entity |
| Extension added to I1 1005 | Addition of extension |
| Link added to I1 1005 with target set to specified item in sync scope (could be beneath F3 1015 or a contributed item) | Addition of link from I1 1005 to target item in the replica scope |
| Link added to I1 1005 with target dangling | Addition of link to item outside the replica scope |
| I1 1005 deleted (un-contribution of I1 1005) | Item deletion |
| Container id updated in contribution configuration | Move within replica scope |
| As item deletion (I1 1005 deleted and un-contribution) | Move out of replica scope |
| I1 1005 renamed to "B", but made unique so it does not collide with I2 | Item I1 1005 renamed to "B" |

Sync initiation: Initiating synchronization against a Replica that contains contributions is done in the same way as described above, except the item domain of the connection must be high enough to include all contribution roots. In other words, connecting to the root of the replica will result in an error.

Filtered Sync Interaction: Item id's for any of the contributed items can be specified (e.g., for root items or any child items).

Ghosted Sync Interaction: Ghosted sync will work for contributed items. A ghosted item can be contributed. No special behavior or checks are performed. It may seem desirable to not allow this as it is a cross-community case and the synced ghosted item may not be possible to un-ghost. However, one can not protect against this, as a complete item that was contributed could be ghosted at a later time.

Overall, extending hierarchical sync scopes to non-hierarchical scenarios provides the ability to tie non-hierarchical pieces of data to a hierarchical scope in a way that supports the scenarios, but does not break the multi-master nature of replication. It accomplishes this by allowing the physical (hierarchical) representations of data on different replicas to be distinct (customized for the needs of that node) and synchronizing the logical views of the data, which are computed from the physical representation and are kept in sync. These logical views are hierarchical, thus allowing the full force of hierarchical sync algorithms to be brought to bear on supporting non-hierarchical sync scopes in hierarchical stores.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method for synchronizing a pair of differently organized data stores comprising:
mapping different physical organizations to similar logical organizations;
utilizing an organization-based synchronization algorithm to synchronize the differently organized data stores; and
employing, by a processor, a corresponding pair of synchronization replicas to map the different physical organizations to similar logical organizations, wherein:
each data store of the pair of differently organized data stores has a respective synchronization replica of the corresponding pair of synchronization replicas associated therewith;
each synchronization replica of the corresponding pair of synchronization replicas defines a data set of items at each respective associated data store;
the defined data set of items takes part in synchronization operations between the associated data stores;
each synchronization replica also defines the different physical organization of the respective data set of items at the respective data store; and
the corresponding pair of synchronization replicas supply a context of a given replica within which synchronization services are carried out between the pair of differently organized data stores.

2. The method of claim 1 further comprising preserving uniqueness constraints of the physical organizations.

3. The method of claim 1 further comprising preserving parent-child ordering constraints of the physical organizations.

4. The method of claim 1 further comprising preserving tombstone propagation and conflict resolution properties of the synchronization algorithm.

5. The method of claim 1 wherein the mapping different physical organizations to similar logical organizations allows adding a data item to become part of a collection of data items that are kept in synchronization with each other by means of peer-to-peer synchronization operations without changing a location of where the data item is physically stored.

6. The method of claim 5 wherein the data items within the collection of data items are contained within a containment hierarchy.

7. The method of claim 6 further comprising contributing at least one data item to a container item in a root of the containment hierarchy.

8. A computer system comprising a processor for synchronizing a pair of differently organized data stores, the processor comprising:
means for mapping different physical organizations to similar logical organizations;
means for utilizing an organization-based synchronization algorithm to synchronize the differently organized data stores; and
means for employing a corresponding pair of synchronization replicas to map the different physical organizations to similar logical organizations, wherein:
each data store of the pair of differently organized data stores has a respective synchronization replica of the corresponding pair of synchronization replicas associated therewith;
each synchronization replica of the corresponding pair of synchronization replicas defines a data set of items at each respective associated data store;
the defined data set of items takes part in synchronization operations between the associated data stores;
each synchronization replica also defines the different physical organization of the respective data set of items at the respective data store; and
the corresponding pair of synchronization replicas supply a context of a given replica within which synchronization services are carried out between the pair of differently organized data stores.

9. The computer system of claim 8 further comprising means for preserving uniqueness constraints of the physical organizations.

10. The computer system of claim 8 further comprising means for preserving parent-child ordering constraints of the physical organizations.

11. The computer system of claim 8 further comprising means for preserving tombstone propagation and conflict resolution properties of the synchronization algorithm.

12. The computer system of claim 8 wherein the means for mapping different physical organizations to similar logical organizations allows adding a data item to become part of a collection of data items that are kept in synchronization with each other by means of peer-to-peer synchronization operations without changing a location of where the data item is physically stored.

13. The computer system of claim 12 wherein the data items within the collection of data items are contained within a containment hierarchy.

14. A computer readable storage medium having computer-executable instructions thereon for implementing a method for synchronizing a pair of differently organized data stores, the instructions for:
mapping different physical organizations to similar logical organizations;
utilizing an organization-based synchronization algorithm to synchronize the differently organized data stores; and
employing a corresponding pair of synchronization replicas to map the different physical organizations to similar logical organizations, wherein:
each data store of the pair of differently organized data stores has a respective synchronization replica of the corresponding pair of synchronization replicas associated therewith;
each synchronization replica of the corresponding pair of synchronization replicas defines a data set of items at each respective associated data store;
the defined data set of items takes part in synchronization operations between the associated data stores;
each synchronization replica also defines the different physical organization of the respective data set of items at the respective data store; and
the corresponding pair of synchronization replicas supply a context of a given replica within which synchronization services are carried out between the pair of differently organized data stores.

15. The computer readable storage medium of claim 14 further comprising computer-executable instructions thereon for preserving uniqueness constraints of the physical organizations.

16. The computer readable storage medium of claim 14 further comprising computer-executable instructions thereon for preserving parent-child ordering constraints of the physical organizations.

17. The computer readable storage medium of claim 14 further comprising computer-executable instructions thereon for preserving tombstone propagation and conflict resolution properties of the synchronization algorithm.

18. The computer readable storage medium of claim 14 wherein the computer-executable instructions thereon for mapping different physical organizations to similar logical organizations allows adding a data item to become part of a collection of data items that are kept in synchronization with each other by means of peer-to-peer synchronization operations without changing a location of where the data item is physically stored.

19. The computer readable storage medium of claim 18 wherein the data items within the collection of data items are contained within a containment hierarchy.

20. The computer readable storage medium of claim 19 further comprising computer-executable instructions thereon for contributing at least one data item to a container item in a root of the containment hierarchy.

* * * * *